3,230,195
ONIUM CATALYSTS FOR POLYESTER PREPARATION
André Jan Conix, Hove-Antwerp, Belgium, assignor to Gevaert Photo-Producten N.V., Mortsel, Belgium, a company of Belgium
No Drawing. Filed Mar. 14, 1961, Ser. No. 95,470
Claims priority, application Belgium, Mar. 18, 1960, 39,631, Patent 588,783; Apr. 29, 1960, 39,742, Patent 590,301
4 Claims. (Cl. 260—47)

This invention relates to an improved process for the manufacture of high-molecular weight linear thermoplastic polyesters. More particularly it relates to such a process wherein onium compounds are used as catalysts.

It is known to prepare high-molecular weight polyesters possessing a high softening point and which are soluble in low boiling solvents, by reacting diphenates of diphenols of the general formula

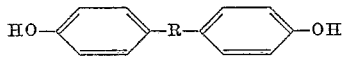

with diacid chlorides of dicarboxylic acid of the general formula

HOOC—A—COOH wherein A is a bivalent radical such as

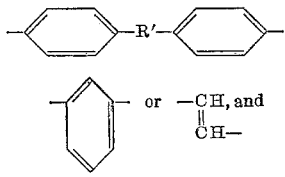

R and R' each represent an ether group, a thioether group, a carbonyl group, a carbon atom making part of a cycloaliphatic ring, or a methylene group which can be substituted by an alkyl group, a halogen atom, a halogenated alkyl group, a cycloalkyl group or an aryl group, preferably at least one of the R and R' being a substituted methylene group or a carbon atom which makes part of a cycloaliphatic group, as described in our U.S. application Serial No. 702,252 filed December 12, 1957, and now abandoned.

Preferably, the polycondensation is carried out in a reaction medium consisting of immiscible liquids, one of them being a solvent or a swelling agent for the dicarboxylic acid chloride and also for the formed polyester, the other liquid being a solvent for the metal diphenate.

From our U.S. application Serial No. 797,587 filed March 6, 1959 and now abandoned it is known to prepare polyesters of the class of polysulphonates by reacting diphenates with aromatic disulphochlorides of the general formula

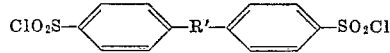

wherein R' has the same significance as above.

Further it is known that in the polycondensation of polyesters and polycondensates according to the above described process, minor amounts of quaternary ammonium compounds can be used as catalysts in form of their free bases or their salts.

Now we have found that high-molecular weight thermoplastic polyphenyl carboxylic acid esters, which are soluble in organic solvents and which are high melting without decomposing, can be prepared much more rapidly, if alkali diphenates in an aqueous solution or suspension are reacted with acid chlorides of dicarboxylic acids dissolved in an organic solvent which is immiscible with water, and which is a solvent for the polyesters and the polysulphonates to be formed in the presence of minor amounts of quaternary phosphonium compounds or quaternary arsonium compounds as catalysts, in form of their free bases or their salts.

Generally the acid chlorides of dicarboxylic acids are soluble in halogenated hydrocarbons. When they are only sparingly soluble in these organic solvents, the diacid chlorides may be dispersed in these organic solvents wherein they partly dissolve. As the reaction proceeds the undissolved diacid chlorides dissolve before reacting.

In principle any quaternary phosphonium compound or quaternary arsonium compound can be used as a catalyst, preferably, however, those which are soluble in water and/or in the organic solvent wherein the polycondensation is carried out.

Specific quaternary phosphonium compounds suitable for being applied in this new process are, e.g.:

triphenyl methyl phosphonium iodide,
triphenyl benzyl phosphonium chloride,
p-xylylene-bis-(triphenyl phosphonium chloride),
tetraethyl phosphonium bromide,
triethyl octadecyl phosphonium iodide,
ethyl cyclopentamethylene phenyl phosphonium acetate,
p-xylylene-bis-(triethyl phosphonium bromide),
bis-(triethyl phosphonium acetate)-1,4-butane and many others such as those described by G. M. Kosolapoff, Organophosphorous Compounds (John Wiley and Sons, Inc., New York, 1950), pp. 86–94.

Specific quaternary arsonium compounds suitable for being applied in this new process are, e.g.:

methyl triphenyl arsonium iodide,
triphenyl benzyl arsonium bromide,
triphenyl benzyl arsonium chloride,
trimethyl octyl arsonium iodide,
triethyl benzyl arsonium iodide,
diphenyl benzyl-α-naphthyl arsonium iodide,
dicarboxymethyl triphenyl arsonium bromide, and many others such as, e.g., those described by A. Michaelis, Ann. Chem. 321 (1902), pp. 141–248, by F. F. Blicke et al., J.A.C.S. 60, 421 (1938); 61, 89 (1939) and 63, 1493 (1941).

The advantages of using quaternary phosphonium compounds as catalysts appears from the following table in which is given a series of comparative intrinsic viscosity values [η] taken from the copolycondensation reaction of the polyphenyl ester of sodium diphenate of 2,2-bis(4-hydroxyphenyl)-propane with a 75/25 mixture of isophthaloyl chloride and terephthaloyl chloride.

| Catalyst | Triphenyl benzyl phosphonium chloride | | Triphenyl methyl phosphonium iodide | | Triethyl benzyl ammonium chloride | |
|---|---|---|---|---|---|---|
| | Concentration | | Concentration | | Concentration | |
| Reaction period | 0.05% | 2% | 0.05% | 2% | 0.05% | 2% |
| | Intrinsic viscosity values | | Intrinsic viscosity values | | Intrinsic viscosity values | |
| 5 min | 0.64 | 0.86 | 0.48 | 1.1 | | 0.44 |
| 30 min | | 1.2 | | 1.0 | | 0.68 |
| 2 h | 1.2 | 1.0 | 1.1 | 1.0 | 0.81 | 1.00 |

The reaction period is measured from the moment that all the reactants are mixed. It appears that the quaternary phosphonium compounds are better catalysts than the quaternary ammonium compounds since:

(1) They give higher maximal intrinsic viscosity values
(2) They work more rapidly, i.e., they markedly shorten the required reaction time for reaching a determined intrinsic viscosity value (3) They can be used in smaller concentrations.

The advantages of using quaternary arsonium compounds as catalysts appears from the following table in which is given a series of comparative intrinsic viscosity values $[\eta]$ taken from the polycondensation reaction of the polyphenyl ester of sodium diphenate of 2,2-bis(4-hydroxyphenyl)-propane with isophthaloyl chloride.

| Catalyst | Triphenyl methyl arsonium iodide, concentrations in percent | | | | | Triethyl benzyl ammonium chloride, concentrations in percent | | | | |
|---|---|---|---|---|---|---|---|---|---|---|
| Reaction period: | 0.05 | 0.1 | 0.2 | 0.5 | 1 | 0.05 | 0.1 | 0.2 | 0.5 | 1 |
| 5 min | | | 0.75 | | | | | 0.18 | | |
| 30 min | | | 1.80 | | | | | 1.03 | | |
| 1 h | 1.7 | 1.85 | 1.85 | 1.80 | 1.30 | 0.50 | 0.90 | 1.34 | 1.65 | 0.7 |

The reaction period is measured from the moment that all the reactants are mixed. For the same reasons as given above in the case of quaternary phosphonium compounds, it appears that also the quaternary arsonium compounds are better catalysts than the quaternary ammonium compounds.

The diphenols which are considered for the preparation of high-molecular weight polyesters according to the present invention correspond to the following general formula:

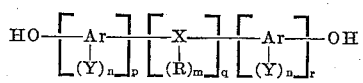

wherein:

Ar represents an aromatic nucleus such as a phenylene nucleus, a biphenylene nucleus or a naphthylene nucleus;

R represents a hydrogen atom, an alkyl group (such as a methyl group and an ethyl group), a halogenated alkyl group, an aryl group (such as a phenyl group and a naphthyl group), a halogenated aryl group, an aralkyl group (such as a benzyl group and a phenylethyl group), a halogenated aralkyl group, an alkyl substituted aryl group, a halogenated alkyl substituted aryl group, a cyclo-aliphatic group or a halogenated cycloaliphatic group;

X represents an alkylene or an alkylidene group such as methylene, ethylene, propylene, ethylidene, propylidene and isopropylidene, or two or more alkylene or alkylidene groups bonded together by an aromatic radical, by a tertiary amino radical (—N(alk)—); by an ether radical (—O—), by a carbonyl radical (—CO—), by a radical containing sulphur such as a sulphide (—S—), a sulphoxide (—SO—) or a sulphonyl (—SO$_2$—) radical. Moreover X can be a cycloaliphatic group, or a radical containing sulphur, such as a sulphide, a sulphoxide or a sulphonyl group, an ether radical, a carbonyl radical or a tertiary amino radical;

Y represents a halogen atom, a nitro group, a R' radical, or an OR' radical wherein R' has the same significance as set forth above for R;

m represents an integer of from 0 to the number of replaceable hydrogen atoms on X;

n represents an integer of from 0 to the number of replaceable hydrogen atoms of the aromatic nucleus Ar;

p is an integer of at least 1;

q is an integer of from 0 to 1, and r is an integer which may be 0 if q is 0.

If in the diphenols according to the formula, more than one substituent Y is present, these substituents may be the same or different. This remark also applies to the substituents R and R'. The hydroxyl groups and the substituents Y of the aromatic nuclei may occur in the ortho-, meta- or para-positions.

Diphenols having the above general formula and which are suitable for being applied according to the present invention are e.g.:

Bis(4-hydroxyphenyl)-methane
Bis(4-hydroxy-3-methyl phenyl)-methane
Bis(4-hydroxy-3,5-dichlorophenyl)-methane
Bis(4-hydroxy-3,5-dibromophenyl)-methane
Bis(4-hydroxy-3,5-difluorophenyl)-methane
Bis(4-hydroxyphenyl)-ketone
Bis(4-hydroxyphenyl)-sulphide
Bis(4-hydroxyphenyl)-sulphone
4,4'-dihydroxydiphenyl ether
1,1-bis(4-hydroxyphenyl)-ethane
2,2-bis(4-hydroxyphenyl)-propane
2,2-bis(4-hydroxy-3-methylphenyl)-propane
2,2-bis(4-hydroxy-3-chlorophenyl)-propane
2,2-bis(4-hydroxy-3,5-dichlorophenyl)-propane
2,2-bis(4-hydroxynaphthyl)-propane
Bis(4-hydroxyphenyl)-phenyl methane
Bis(4-hydroxyphenyl)-diphenyl methane
Bis(4-hydroxyphenyl)-4'-methyl phenyl methane
1,1-bis(4-hydroxyphenyl)-2,2,2-trichloroethane
Bis(4-hydroxyphenyl)-(4''-chlorophenyl)-methane
1,1-bis(4-hydroxyphenyl)-cyclohexane
Bis(4-hydroxyphenyl)-cyclohexyl methane
4,4'-dihydroxydiphenyl
2,2'-dihydroxydiphenyl
Dihydroxynaphthalenes such as 2,6-dihydroxynaphthalene
hydroquinone
Resorcinol
2,6-dihydroxytoluene
2,6-dihydroxychlorobenzene
3,6-dihydroxytoluene As dicarboxylic acid chlorides for the reaction are considered acid chlorides having the formula ClOC—Z—COCl wherein Z represents a single bond or one of the radicals $$-(CR_1R_2-)_{n'}-, \quad -\overset{\overset{\displaystyle O}{\|}}{C}R_1, \quad -O-(CR_1R_2)_{n'}-O-, \quad -Ar'-, \quad -Ar'-Ar'-$$

$$-Ar'-X'-Ar'-, \quad -(CR_1R_2)_{m'}-Ar'-(CR_1R_2)_{m'}-$$
$$-(CR_1R_2)_{m'}-O-Ar'-O-(CR_1R_2)_{m'}-$$

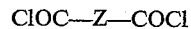

$$-O-Ar'-O-, \quad -O-Ar'-X'-Ar'-O-$$
$$-O-(CR_1R_2)_{m'}-O-Ar'-X'-Ar'-(CR_1R_2)_{m'}-O$$
$$-O-(CR_1R_2)_{m'}-Ar'-(CR_1R_2)_{m'}-O-$$

in which radicals:

Ar' represents an arylene radical such as an o-phenylene radical a m-phenylene radical, a p-phenylene radical and a naphthylene radical, these arylene radicals occasionally being substituted by an alkyl group or by a halogen atom;

$R_1$ and $R_2$ each represents a hydrogen atom, an alkyl radical or an aryl radical;

X' represents a single bond or one of the radicals —$CZ_1Z_2$—, —CO—, —O—, —S—, —SO—, or —$SO_2$— wherein $Z_1$ and $Z_2$ each represent a hydrogen atom, an alkyl group, an aryl group, or together represent the atoms necessary to complete a cycloaliphatic ring;
$m'$ is an integer of from 1 to 2;
$n'$ is an integer of from 1 to 20, and

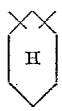

means partial or complete hydrogenation of an aromatic nucleus, the free bonds of which are in the 1,1-; 1,2-; 1-3- or 1,4-position.

As dicarboxylic acids chlorides suitable for being used according to the method of the present invention are considered: terephthalic acid chloride, isophthalic acid chloride, phthalic acid, sebacic acid chloride, adipic acid, bischloroformate of 2,2 - bis(4-hydroxyphenyl)-propane and ethylene glycol bischloroformate.

If they are sufficiently soluble the high-molecular weight linear polyphenyl esters according to the present invention can be worked up from solutions to films and filaments.

Furthermore, the polyesters prepared according to the present invention are thermoplastic and can be worked up from the melt by extrusion, injection moulding, calandering or other methods into shaped articles of consumption. Among these articles foils are to be mentioned especially.

The following examples illustrate the present invention without limiting, however, the scope thereof. The intrinsic viscosity values $[\eta]$ were measured in sym.-tetrachloroethane at 25° C.

Example 1

In a 250 cm.³ three-necked flask fitted with a stirrer and a dropping funnel are placed 4.56 g. (0.02 mol) of 2,2-bis(4-hydroxyphenyl)-propane, 75 mg. (1% based on the weight of polymer) of triphenyl methyl arsonium iodide, 40.4 g. of N sodium hydroxide (this being an excess of 1%) and 20 cm.³ of methylene chloride. Over 5 min. is dropwise added thereto a solution of 4.06 g. of isophthaloyl chloride (0.02 mol) in 15 cm.³ of methylene chloride. After rinsing the dropping funnel with 5 cm.³ of methylene chloride, the mixture is stirred for a further hour. During the polycondensation the reaction mixture separates into a highly viscous organic layer and a water layer which is decanted. After washing the organic layer with water, the polymer is precipitated by pouring in boiling water. The formed flakes are dried at 110° C. Yield: 7.2 g. $[\eta]=1.30$ dl./g.

The formed polyester corresponds to the formula

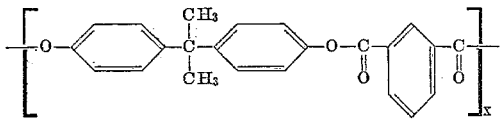

Example 2

The same procedure as in Example 1 is carried through, using, however, as a catalyst only 40 mg. of triphenyl methyl arsonium iodide (0.5% based on the weight of formed polymer). $[\eta]=1.80$ dl./g.

Example 3

The same procedure as in Example 1 is carried through, employing, however, as a catalyst but 15 mg. of triphenyl methyl arsonium iodide (0.2% based on the weight of formed polymer). $[\eta]=1.85$ dl./g.

Example 4

The same procedure as in Example 1 is carried through, employing, however, as a catalyst but 8 mg. of triphenyl methyl arsonium iodide (0.1% based on the weight of formed polymer). $[\eta]=1.85$ dl./g.

Example 5

The same procedure as in Example 1 is carried through, employing, however, as a catalyst but 4 mg. of triphenyl methyl arsonium iodide (0.05% based on the formed polymer). $[\eta]=1.7$ dl./g.

Example 6

The same procedure as in Example 1 is carried through using, however, as a catalyst 15 mg. of triphenyl methyl arsonium iodide and stirring the reaction mixture for only 30 min. $[\eta]=1.80$ dl./g.

Example 7

The same procedure as in Example 1 is carried through, using, however, as a catalyst 15 mg. of triphenyl methyl arsonium iodide and stirring the reaction mixture for only 5 min. $[\eta]=0.75$ dl./g.

Example 8

In a 250 cm.³ three-necked flask fitted with a stirrer, a dropping funnel and a thermometer are placed 4.56 g. of 2,2-bis(4-hydroxyphenyl)-propane (0.02 mol), 150 mg. of triphenyl benzyl arsonium bromide (2% based on the weight of polymer), 40.4 cm.³ (1% of excess) of N sodium hydroxide and 20 cm.³ of methylene chloride. Over 5 min. is dropwise added thereto a solution of 4.06 g. of isophthaloyl chloride (0.02 mol) in 15 cm.³ of methylene chloride. After rinsing the dropping funnel with 5 cm.³ of methylene chloride, the mixture is stirred for another 30 minutes. The reaction mixture separates into a highly viscous organic layer and a water layer which is decanted. After washing the organic layer with water, the polymer is precipitated by pouring in boiling water. The formed flakes are dried at 110° C. $[\eta]=1.22$ dl./g.

Example 9

In a 250 cm.³ three-necked flask fitted with a stirrer, a thermometer and a dropping funnel, which flask is cooled in an ice-acetone bath of $-10°$ C. are placed 6.35 g. of 1,1 - bis(4 - hydroxyphenyl) - 2,2,2-trichloroethane (0.02 mol), 4.06 g. of isophthaloyl chloride (0.02 mol), 200 mg. of triphenyl benzyl arsonium bromide and 25 cm.³ of methylene chloride. The temperature in the flask being $-5°$ C. and whilst thoroughly stirring, 40.4 cm.³ of N sodium hydroxide (1% of excess) are added over 5 min. Stirring is continued for 30 min. at $-5°$ C. and then for 90 min. at room temperature. The reaction mixture separates into a highly viscous organic layer and a water layer which is decanted. After washing the organic layer with water, the polymer is precipitated by pouring the solution into boiling water. The obtained flakes are then dried at 110° C. $[\eta]=0.70$ dl./g.

The obtained polyester has the formula:

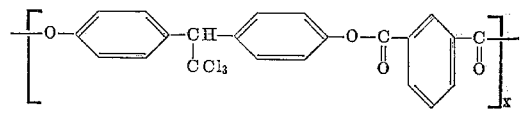

Example 10

In a 250 cm.³ three-necked flask fitted with a stirrer and a dropping funnel are placed 3.66 g. (0.01 mol) of 2,2-bis(4-hydroxy-3,5-dichlorophenyl)-propane, 120 mg. of triphenylbenzyl arsonium chloride, 20.2 cm.³ of N sodium hydroxide and 3 cm.³ of 1,1,2-trichloroethane. Over 5 min. are added thereto 2.95 g. of 4,4'-diphenyl ether dicarboxylic acid chloride (0.01 mol) and 7 cm.³ of 1,1,2-trichloroethane. After rinsing with 5 cm.³ of 1,1,2-trichloroethane, stirring is continued for 1 hour. The reaction mixture separates into a highly viscous organic layer and a water layer which is decanted. After washing the organic layer with water, the polymer is precipitated by pouring the reaction mixture into alcohol, after diluting with 20 cm.³ of 1,1,2-trichloroethane. The obtained flakes are then dried at 110° C. [η]=1.0 dl./g. The obtained polyester has the formula:

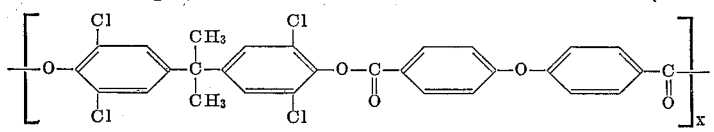

Example 11

In a 250 cm.³ three-necked flask, fitted with a stirrer and a dropping funnel are placed 2.28 g. (0.01 mol) of bis(4 - hydroxy - 3 - methylphenyl)-methane, 90 mg. of triphenyl benzyl arsonium iodide, 20.2 g. of N sodium hydroxide and 3 cm.³ of methylene chloride. Over 5 min. is added thereto a solution of 2.95 g. (0.01 mol) of 4,4′-diphenyl ether dicarboxylic acid chloride in 7 cm.³ of methylene chloride. After rinsing with 5 cm.³ of methylene chloride stirring is continued for 2 h. The reaction mixture separates into a highly viscous organic layer and a water layer which is decanted. After washing the organic layer with water, the polymer is precipitated by pouring into boiling water. The obtained flakes are dried at 110° C. [η]=1.6 dl./g.

The formed polyester has the formula:

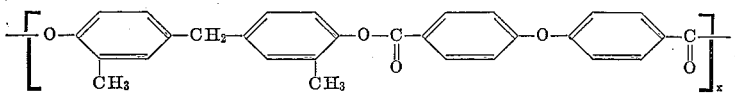

Example 12

The same procedure as in Example 11 is carried through, employing, however, 2.28 g. of 2,2-bis(4-hydroxyphenyl)-propane instead of 2.28 g. of bis(4-hydroxy-3-methylphenyl)-methane. [η]=1.3 dl./g. The obtained polyester has the formula

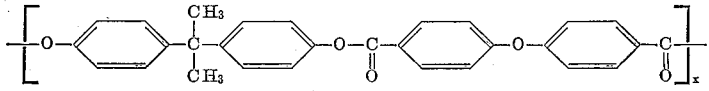

Example 13

In a 250 cm.³ three-necked flask fitted with a stirrer, a thermometer and a dropping funnel are placed 4.56 g. (0.02 mol) of 2,2-bis(4-hydroxyphenyl)-propane, 4 mg. of triphenyl methyl arsonium iodide (0.05% based on the weight of polymer), 40.4 cm.³ of N sodium hydroxide and 25 cm.³ of methylene chloride. Over 4 minutes is dropwise added thereto a solution of 3.045 g. of isophthaloyl chloride (0.015 mol) and 1.015 g. of terephthaloyl chloride (0.005 mol) in 15 cm.³ of methylene chloride. After rinsing with 5 cm.³ of methylene chloride stirring is continued for 10 minutes. The reaction mixture separates into a highly viscous organic layer and a water layer which is decanted. After washing the organic layer with water the polymer is precipitated by pouring into alcohol, after diluting with 20 cm.³ of methylene chloride. The formed flakes are dried at 110° C. [η]=1.4 dl./g. The obtained copolyester has the formula:

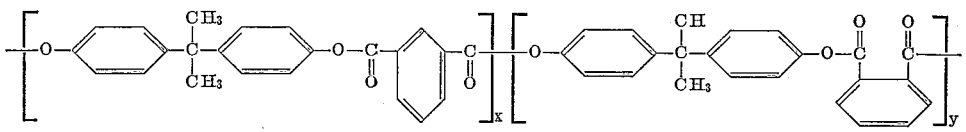

Example 14

In a 250 cm.³ three-necked flask fitted with a stirrer and a dropping funnel are placed 9.12 g. (0.04 mol) of 2,2-bis(4-hydroxyphenyl)-propane, 320 mg. of triphenyl benzyl arsonium bromic 80.8 cm.³ (1% of excess) of N sodium hydroxide and 10 cm.³ of methylene chloride. Over 10 min. is dropwise added thereto a solution of 4.06 g. (0.02 mol) of isophthaloyl chloride and 4.06 g. (0.02 mol) of o-phthaloyl chloride in 30 cm.³ of methylene chloride. After rinsing with 10 cm.³ of methylene chloride, stirring is continued for 2 h. The reaction mixture separates into a highly viscous organic layer and a water layer which is decanted. After washing the organic layer with water the polymer is precipitated by pouring into boiling water. The obtained flakes are dried at 110° C. [η]=0.9 dl./g. The formed copolyester has the formula

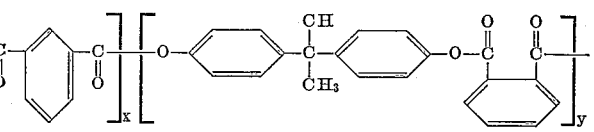

Example 15

In a 250 cm.³ three-necked flask fitted with a stirrer and a dropping funnel are placed 9.12 g. (0.04 mol) of 2,2-bis(4-hydroxyphenyl)-propane, 200 mg. of triphenylmethyl arsonium iodide, 84 cm.³ (5% of excess) of N sodium hydroxide and 10 cm.³ of methylene chloride. Over 5 min. is added thereto a solution of 6.5 g. (0.04 mol plus an excess of 5%) of fumaroyl chloride in 15 cm.³ of methylene chloride. The dropping funnel is then rinsed with 10 cm.³ of methylene chloride and stirring is continued for 1 h. The reaction mixture separates into a highly viscous organic layer and a water layer which is decanted. After washing the organic layer with water the polymer is precipitated by pouring into boiling water. The obtained flakes are dried at 110° C. [η]=0.7 dl./g.

The formed polyester has the formula:

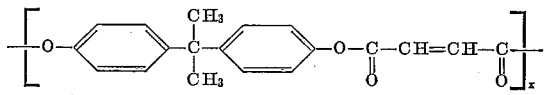

Example 16

In a 250 cm.³ three-necked flask fitted with a stirrer and a dropping funnel are placed 4.56 g. (0.02 mol) of 2,2-bis(4-hydroxyphenyl)-propane, 150 mg. of triphenylmethyl phosphonium iodide (2% based on the weight of polymer), 40.4 cm.³ (1% of excess) of N sodium hydroxide and 6 cm.³ of methylene chloride. Over 5 min. is dropwise added thereto with stirring a solution of 3.045 g. (0.015 mol) of isophthaloyl chloride and 1.015 g. (0.005 mol) of terephthaloyl chloride in 14 cm.³ of methylene chloride. After rinsing the dropping funnel with 5 cm.³ of methylene chloride, stirring is continued for 2 h. The concentration of polymer in methylene chloride then amounts to 50%. During the polycondensation the reaction mixture separates into a highly viscous organic layer and a water layer which is decanted. After washing the organic layer with water, the polymer is precipitated by pouring into boiling water. The ob-

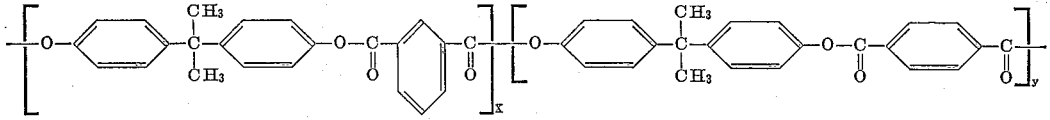

tained flakes are then dried at 110° C. Yield: 7.2 g. [η]=1.04 dl./g.

The formed copolyester has the formula:

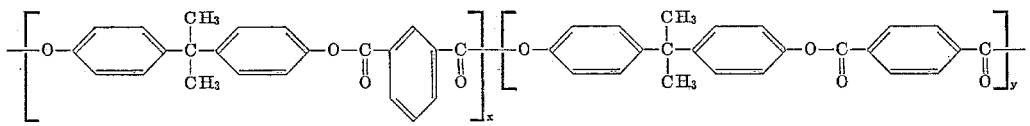

Example 17

The same procedure as in Example 16 is carried through stirring, however, for only 30 minutes. [η]=1.02 dl./g.

Example 18

The same procedure as in Example 8 is carried through, stirring, however, for only 5 minutes. [η]=1.1 dl./g.

Example 19

The same procedure as in Example 16 is carried through, employing, however, as a catalyst but 4 mg. of triphenyl methyl phosphonium iodide (0.05% based on the weight of polymer) and stirring for 2 h. [η]=1.14 dl./g.

Example 20

The same procedure as in Example 19 is carried through, stirring, however, for only 5 min. [η]=0.48 dl./g.

Example 21

In a 250 cm.³ three-necked flask fitted with a stirrer and a dropping funnel are brought 4.56 g. (0.02 mol) of 2,2-bis(4-hydroxyphenyl)-propane, 150 mg. of triphenylbenzyl phosphonium chloride (2% based on the weight of polymer), 40.4 cm.³ (1% of excess) of N sodium hydroxide and 6 cm.³ of methylene chloride. Over 5 minutes is dropwise added thereto a solution of 3.045 g. (0.015 mol) of isophthaloyl chloride and 1.015 g. (0.005 mol) of terephthaloyl chloride in 14 cm.³ of methylene chloride. The funnel is rinsed with 5 cm.³ of methylene chloride and the reaction mixture is stirred for 2 h. The concentration of the polymer thus amounts to 50%. During the polycondensation the reaction mixture separates into a highly viscous organic layer and a water layer which is decanted. After washing the organic layer with water, the polymer is precipitated by pouring in boiling water. The formed flakes are dried at 110° C. [η]=1.02 dl./g.

Example 22

The same procedure as in Example 21 is carried through, stirring, however, for only 30 minutes. [η]=1.22 dl./g.

Example 23

The same procedure as in Example 21 is carried through, stirring, however, for only 5 minutes. [η]=0.86 dl./g.

Example 24

The same procedure as in Example 21 is carried through, employing, however, as a catalyst only 4 mg. of triphenyl benzyl phosphonium chloride (0.05% based on the weight of polymer). [η]=1.10 dl./g.

Example 25

The same procedure as in Example 21 is carried through, employing, however, as a catalyst only 4 mg. of triphenyl benzyl phosphonium chloride (0.05% based on the weight of polymer) and stirring for only 5 min. [η]=0.64 dl./g.

Example 26

In a 250 cm.³ three-necked flask fitted with a stirrer, a thermometer and a dropping funnel and which is cooled at −10° C. in an ice-acetone bath are placed 6.35 g. (0.02 mol) of 1,1-bis(4-hydroxyphenyl)-2,2,2-trichloroethane, 4.06 g. (0.02 mol) of isophthaloyl chloride, 200 mg. of triphenyl benzyl phosphonium chloride and 25 cm.³ of methylene chloride. Whilst strongly stirring and at a temperature in the flask of −5° C. is added to the reaction mixture over 5 min. 40.4 cm.³ (1% of excess) of N sodium hydroxide. Stirring is continued at this temperature for 30 min. and then at room temperature for 90 min. During the polycondensation the reaction mixture separates into a highly viscous organic layer and a water layer which is decanted. After washing the organic layer with water, the polymer is precipitated by pouring into boiling water. The obtained flakes are then dried at 110° C. [η]=0.84 dl./g.

The formed polyester has the formula:

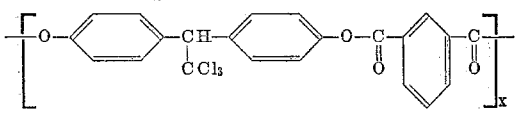

Example 27

In a 250 cm.³ three-necked flask fitted with a stirrer and a dropping funnel are placed 3.66 g. (0.01 mol) of 2,2-bis(4-hydroxy,3,5-dichlorodiphenyl)-propane, 120 mg. of triphenyl benzyl phosphonium chloride, 20.2 cm.³ of N sodium hydroxide and 3 cm.³ of 1,1,2-trichloroethane. Over 5 min. is added thereto a solution of 2.95 g. (0.01 mol) of 4,4'-diphenyl ether dicarboxylic acid chloride and 7 cm.³ of 1,1,2-trichloroethane. After rinsing the funnel with 5 cm.³ of 1,1,2-trichloroethane stirring is continued for 1 hour. During the polycondensation the reaction mixture separates into a highly viscous organic layer and a water layer which is decanted. After washing the organic layer with water, 20 cm.³ of 1,1,2-trichloroethane are added. The polymer is precipitated by pouring out this mixture into alcohol. The obtained flakes are dried at 110° C. [η]=1.06 dl./g.

The formed polyester has the formula:

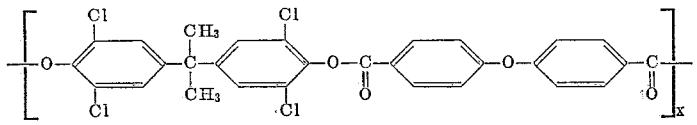

Example 28

In a 250 cm.³ three-necked flask fitted with a stirrer and a dropping funnel are brought 2.28 g. (0.01 mol) of bis-(4-hydroxy-3-methylphenyl)-methane, 90 mg. of triphenyl benzyl phosphonium chloride, 20.2 cm.³ of N sodium hydroxide and 3 cm.³ of methylene chloride. Over 5 min. is added thereto a solution of 2.95 g. (0.01 mol) of 4,4'-diphenyl ether dicarboxylic acid chloride in 7 cm.³ of methylene chloride. After rinsing the dropping funnel with 5 cm.³ of methylene chloride, the mixture is stirred for another 2 h. During the condensation the reaction mixture separates into a highly viscous organic layer and a water layer which is decanted. After washing the organic layer with water, the polymer is precipitated by pouring in boiling water. The formed flakes are dried at 110° C. $[\eta]=1.55$ dl./g.

obtained which are dried at 110° C. $[\eta]=0.75$ dl./g. The formed copolyester corresponds to the formula:

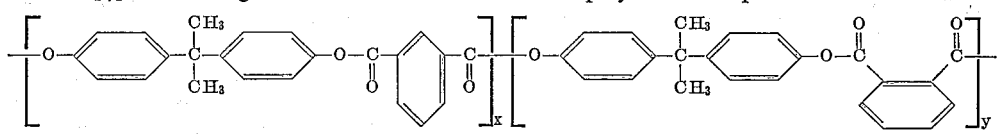

The formed polyester corresponds to the formula:

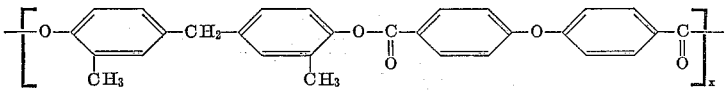

Example 29

The same procedure as in Example 28 is carried through, using, however, 2.28 g. of 2,2-bis(4-hydroxyphenyl)-propane instead of 2.28 g. of bis(4-hydroxy-3-methylphenyl)-methane. $[\eta]=1.55$ dl./g. The formed polyester corresponds to the formula:

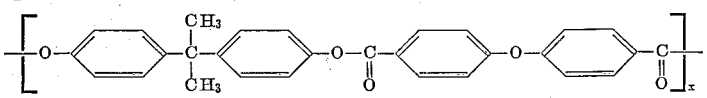

Example 30

In a 250 cm.³ three-necked flask fitted with a stirrer and a dropping funnel are brought 4.56 g. (0.02 mol) of 2,2-bis(4-hydroxyphenyl)-propane, 4 mg. (0.05% based on the weight of polymer) of triphenyl methyl phosphonium iodide, 40.4 cm.³ of N sodium hydroxide and 25 cm.³ of 1,1,2-trichloroethane. Over 4 min. are added thereto a solution of 4.06 g. (0.02 mol) of isophthaloyl chloride in 15 cm.³ of methylene chloride. After rinsing the funnel with 5 cm.³ of 1,1,2-trichloroethane stirring is continued for 10 min. During the polycondensation the reaction mixture separates into a highly viscous organic layer and a water layer which is decanted. After washing the organic layer with water and diluting with 20 cm.³ of 1,1,2-trichloroethane the polymer is precipitated by pouring in alcohol. The obtained flakes are dried at 110° C. $[\eta]=1.16$ dl./g. The formed polyester corresponds to the formula:

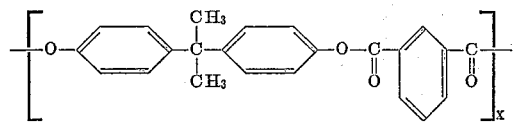

Example 31

In a 250 cm.³ three-necked flask fitted with a stirrer and a dropping funnel are placed 9.12 g. (0.04 mol), of 2,2-bis(4-hydroxyphenyl)-propane, 320 mg. of triphenyl benzyl phosphonium chloride, 80.8 cm.³ (1% of excess) of 1 sodium hydroxide and 10 cm.³ of methylene chloride. Over 10 min. is dropwise added thereto a solution of 4.06 g. (0.02 mol) of isophthaloyl chloride and 4.06 g. (0.02 mol) of o-phthaloyl chloride in 30 cm.³ of methylene chloride. After rinsing the dropping funnel with 10 cm.³ of methylene chloride, stirring is continued for 2 h. After the usual treatment polymer flakes are

Example 32

In a 250 cm.³ three-necked flask fitted with a stirrer and a dropping funnel are placed 9.12 g. (0.04 mol) of 2,2-bis(4-hydroxyphenyl)-propane, 200 mg. of triphenyl benzyl phosphonium chloride, 84 cm.³ (5% of excess) of N sodium hydroxide and 10 cm.³ of methylene chloride. Over 5 min. is added thereto a solution of 6.5 g. (0.04 mol plus an excess of 5%) of fumaroyl chloride in 15 cm.³ of methylene chloride. After rinsing the dropping funnel with 10 cm.³ of methylene chloride, stirring is continued for still 1 h. During the polycondensation the reaction mixture separates into a highly viscous organic layer and a water layer which is decanted. After washing the organic layer with water, the polymer is precipitated by pouring in boiling water. The formed flakes are dried at 110° C. $[\eta]=0.6$ dl./g.

The obtained polyester has the formula:

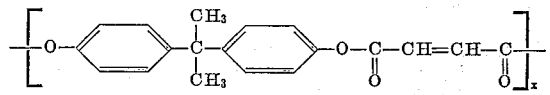

I claim:
1. A process for preparing high molecular weight linear thermoplastic polyesters comprising, reacting an alkali metal diphenate of a diphenol in aqueous solution with at least one organic dicarboxylic acid halide, dissolved in a halogenated hydrocarbon solvent, which is a solvent for the polyester to be formed, in the presence of a catalyst selected from the group consisting of quaternary phosphonium compounds and quaternary arsonium compounds.

2. The process of claim 1, wherein the organic dicarboxylic acid dihalide is an aromatic dicarboxylic acid dichloride.

3. The process of claim 2 wherein the aromatic dicarboxylic acid dichloride comprises isophthaloyl chloride.

4. The process of claim 2 wherein the aromatic dicarboxylic acid dichloride comprises terephthaloyl chloride.

References Cited by the Examiner
UNITED STATES PATENTS

| | | | |
|---|---|---|---|
| 2,475,005 | 7/1949 | Brannon | 260—59 |
| 3,028,364 | 4/1962 | Conix | 260—49 |

FOREIGN PATENTS 553,967   1/1957   Belgium.

WILLIAM H. SHORT, *Primary Examiner*,
H. N. BURSTEIN, *Examiner*.